United States Patent

Brandt

[11] 3,967,049
[45] June 29, 1976

[54] MOUNTING STRAP

[75] Inventor: Burkhard A. Brandt, Santa Monica, Calif.

[73] Assignee: Sola Basic Industries, Inc., Milwaukee, Wis.

[22] Filed: Feb. 27, 1975

[21] Appl. No.: 553,679

[52] U.S. Cl. .................... 174/53; 174/58; 151/69; 200/294; 339/133 R
[51] Int. Cl.² .......................... H02G 3/08
[58] Field of Search .................. 174/53, 58, 51; 339/122 R, 132 R, 133 R; 151/69; 200/293, 294, 60

[56] References Cited
UNITED STATES PATENTS

| | | | |
|---|---|---|---|
| 3,263,949 | 8/1966 | Conrad | 151/69 UX |
| 3,403,215 | 9/1968 | Slater et al. | 174/53 |
| 3,609,213 | 9/1971 | Winter et al. | 174/51 |

Primary Examiner—Darrell L. Clay
Attorney, Agent, or Firm—Smythe & Moore

[57] ABSTRACT

A mounting strap for mounting an electrical wiring device, such as a switch, having apertures at both ends for receiving mounting screws. The apertures have resilient lips which engage the threaded portion of the screws to prevent the free movement thereof. The mounting strap is adapted to fit on a mounting box with the electrical wiring device located within the mounting box.

6 Claims, 7 Drawing Figures

U.S. Patent   June 29, 1976   3,967,049
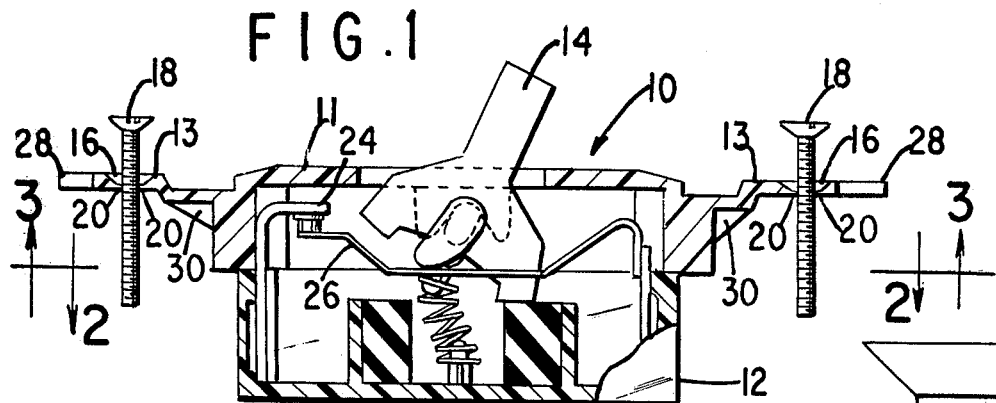
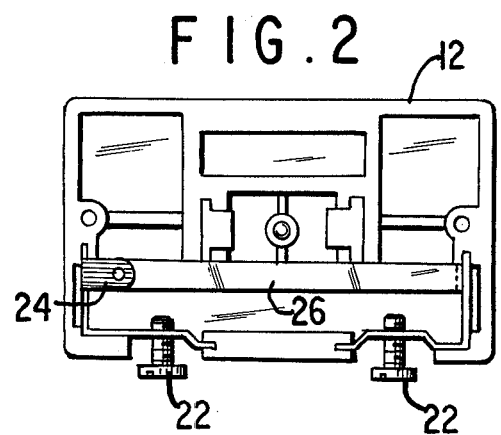
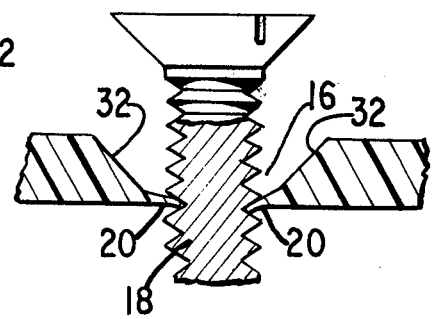
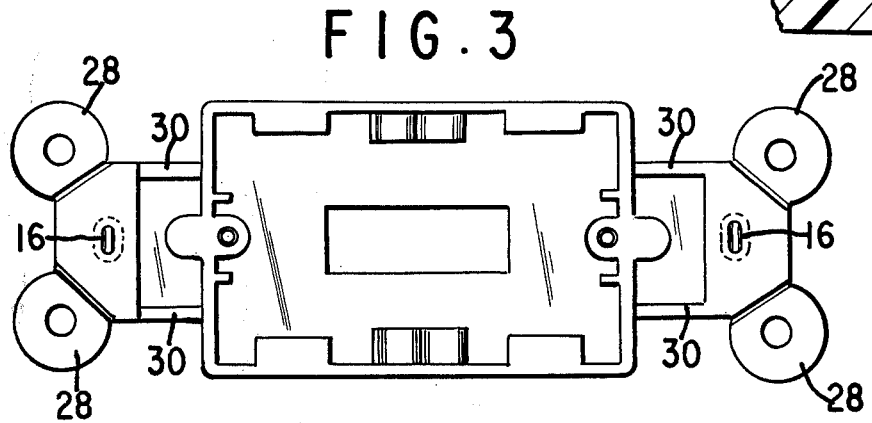
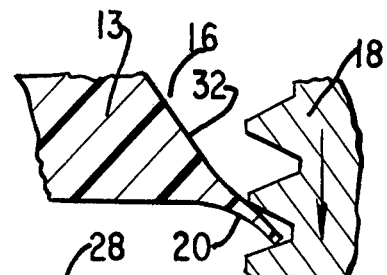
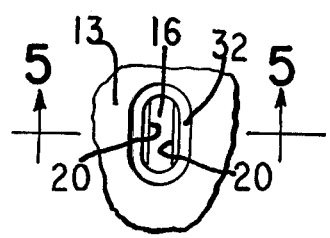
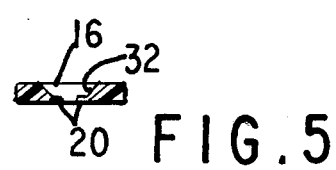

MOUNTING STRAP

This invention relates to electrical wiring devices and more specifically, to mounting straps for mounting electrical wiring devices.

It has been the prior practice to mount electrical switches, receptacles or other wiring devices on a mounting strap to hold the device in a mounting box. The mounting box is a rigid container which protects the electrical device and helps to prevent nearly conductive devices from touching the electrical device and causing a short. The mounting strap is a rigid strap piece that is permanently mounted on the electrical device and has apertures at each end in which screws are located.

When the electrical device, with its mounting strap, is not mounted in the mounting box, the screws are loose in the mounting strap and may fall out and be lost. Consequently, several approaches have been used to keep the screws in an aperture in the mounting strap. For example, a small paper wafer with a hole in it may be forced over the ends of the screws to hold them in place. However, this paper wafer may fall off after much vibration. Also, an extra manufacturing step is required which increases the cost. Another technique is to put a piece of spring steel wire beside the aperture so that, when the screw is inserted, it is pinched or held in the hole. However, this also increases manufacturing costs.

It is, therefore, an object of the invention to provide an improved means for retaining the mounting screw means.

It is another object of the present invention to provide an improved electrical wiring device mounting strap capable of retaining the mounting screws.

It is still another object of the present invention to provide a mounting strap for an electrical wiring device which is capable of retaining the mounting screws without a substantial increase in manufacturing costs.

It is yet another object of the present invention to provide a mounting strap for an electrical wiring device capable of retaining mounting screws and yet allowing their forcible removal without damage to the mounting strap.

These and other objects and features will become apparent from the following detailed description of the invention along with the attached drawings.

In the drawings:

FIG. 1 is a sectional view of an electrical switch with a mounting strap constructed in accordance with the present invention;

FIG. 2 is a plan view of the switch in FIG. 1 showing the bottom half thereof;

FIG. 3 is a view of the switch of FIG. 1 looking upward from the bottom of the upper half or mounting strap portion of the switch;

FIG. 4 is a fragmentary view of an aperture in the mounting strap of FIG. 1;

FIG. 5 is a fragmentary sectional view of the aperture looking along the line 5—5 of FIG. 4;

FIG. 6 is a fragmentary enlarged sectional view of the aperture of the mounting strap shown in FIG. 1 having a screw located therein; and FIG. 7 shows an enlarged fragmentary view of a part of the lip of the aperture shown in FIG. 6 engaging the screw threads.

With reference to FIG. 1, an electrical switch 10 has an upper body or mounting strap portion 11 and a lower body 12. The upper body has mounting strap portions 13, 13. A switch lever 14 operates the internal switching mechanism which can be of any desirable kind. The mounting strap portions 13 have bevelled apertures 16 with mounting screws 18 located therein. The mounting screws 18 thread into mounting holes in a mounting box (not shown). The bevelled apertures 16 of the mounting strap portions 13 have resilient lips 20 which engage the threads of screws 18 to prevent or to inhibit free movement thereof relative to the strap portion. In practice, the mounting straps 13 may be made of a resilient plastic material and may be molded together with the upper part of the switch body 11. Lips 20 of apertures 16 are sufficiently thin and resilient to allow the forceful removal of screws 18 without permanent deformation of the lips.

The lower portion 12 of the switch 10 is shown in FIG. 2. Conventional wire mounting or connecting screws 22 and switch contacts 24 and 26 are located within the switch 10.

The apertures 16 in the mounting strap portions are elongated in a direction transverse to the length of the mounting straps. The mounting strap portions 13 have apertured ears 28 (FIG. 3) and reinforcing gussets 30 (FIGS. 1, 3).

The elongated apertures 16 have a bevelled side 32 (FIG. 4) adjacent the resilient lips 20. The apertures 16 are elongated so that the electrical switch will have a small amount of lateral movement for greater versatility in mounting the switch.

A sectional view of an aperture 16 is shown in FIG. 4 together with the bevelled side 32 and resilient lips 20.

With reference to FIG. 6, a screw 18 is shown located within an aperture 16 having bevelled side 32 and resilient lips 20. The resilient lips 20 are engaged in the threads of the screw 18, preventing the screw from freely moving. However, since the lips 20 are resilient, the screw 18 may be forcibly removed with the threads forcing the resilient lips towards the bevelled sides 32. The lips 20 will not be permanently deformed during such a removal.

An enlarged view of the aperture 16 is seen in FIG. 7 with the resilient lip 20 between two threads of the screw 18 to prevent free motion of the screw 18. If the screw 18 is pushed downward, the resilient lip 20 will yield, thus allowing a downward motion of the screw 18.

In the form shown, the mounting strap and upper body portion are integral. It also would be possible to have a separate upper body and mounting strap (not shown).

It is to be understood that changes in various details of construction and arrangement of parts may be made without departing from the spirit of the invention except as defined in the appended claims.

What is claimed is:

1. An electrical wiring device comprising a housing having a lower body portion and an upper body portion, components of said wiring device arranged within said housing, a plastic mounting strap means on one of said body portions and projecting laterally therefrom and having bevelled apertures at either end thereof receiving threaded screw means for mounting said strap means on a mounting surface with said wiring device projecting thereinto, said bevelled apertures being transversely elongated and having resilient lips engaging said threaded screw means to prevent free movement thereof.

2. A wiring device according claim 1, wherein the bevels of said apertures are adapted to receive the head of said threaded screw means and said lips are formed near the narrowest portion of said apertures.

3. A wiring device according to claim 1 wherein the mounting strap is integral with the upper body portion.

4. A wiring device according to claim 3 wherein the wiring device is a switch.

5. An electrical wiring device comprising a housing having a lower body portion and an upper body portion, components of said wiring device arranged within said housing, a resilient plastic mounting strap means on said upper body portion and projecting laterally therefrom and having bevelled apertures at either end thereof receiving threaded screw means for mounting said strap means on a mounting surface with said wiring device projecting thereinto, said bevelled apertures having resilient lips yieldingly engaging said threaded screw means to prevent free movement thereof.

6. A wiring device according to claim 5 wherein the wiring device is a switch.

* * * * *